US007079386B1

(12) United States Patent  
Jochym et al.

(10) Patent No.: US 7,079,386 B1  
(45) Date of Patent: Jul. 18, 2006

(54) COMPUTER SYSTEM AND SCALABLE PROCESSOR ASSEMBLY THEREFOR

(75) Inventors: Daniel A. Jochym, Downington, PA (US); Christian E. Shenberger, Red Lion, PA (US); Keith D. Mease, Gibbstown, NJ (US); Joseph J. Scorsone, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 10/390,243

(22) Filed: Mar. 17, 2003

(51) Int. Cl.  
*G06F 1/20* (2006.01)

(52) U.S. Cl. ...................................... 361/687; 361/683

(58) Field of Classification Search ................ 361/683, 361/687  
See application file for complete search history.

(56) References Cited

U.S. PATENT DOCUMENTS

| 5,150,279 | A | * | 9/1992 | Collins et al. ............... 361/686 |
| 5,986,882 | A | * | 11/1999 | Ekrot et al. ................. 361/687 |
| 6,411,506 | B1 | * | 6/2002 | Hipp et al. .................. 361/686 |
| 6,583,989 | B1 | * | 6/2003 | Guyer et al. ................ 361/724 |
| 2004/0042162 | A1 | * | 3/2004 | Barsun et al. | |

* cited by examiner

*Primary Examiner*—Yean-Hsi Chang  
(74) *Attorney, Agent, or Firm*—Lise A. Rode; Mark T. Starr; Ratner Prestia (57) ABSTRACT

A computer system is provided with a rack defining an interior. A computer chassis is mounted at least partially within the interior of the rack, wherein the computer chassis defines an interior. An interconnect assembly is mounted at least partially within the interior of the rack, wherein the interconnect assembly has an interconnect connector. A processor assembly is mounted at least partially within the interior of the computer chassis, and the processor assembly has a processor board and a processor connector mounted to the processor board and connected to the interconnect connector of the interconnect assembly. The processor assembly also has at least eight addressable processor segments mounted to the processor board.

29 Claims, 9 Drawing Sheets

COMPUTER SYSTEM AND SCALABLE PROCESSOR ASSEMBLY THEREFOR

FIELD OF THE INVENTION

This invention relates to a computer system. In particular, this invention relates to a computer system and a scalable processor assembly configured to be mountable within the computer system.

BACKGROUND OF THE INVENTION

In computer systems such as server systems, for example, it is often desirable to enhance system performance by increasing processor and bus frequencies and decreasing transmission times between system components. The desire to decrease transmission times between these system components is particularly relevant in computer server systems because the inclusion of multiple processor and memory components in a computer server system creates additional transmission paths and increases the distance over which the signals are transmitted.

In very large computer server systems, such as those containing 8 or more processors, it may be desirable to include 8, 16, 24, 32 or 64 or more processors. Such systems are generally made up of a number of processor cards that are interconnected to one another. Conventional connections among such processor cards can increase the distance over which signals are transmitted and increase transmission times between components of different cards.

As such, it would be desirable to provide a computer system that can be configured for reduced interconnect lengths and decreased signal transmission times between and within each of the processors, thereby enhancing system performance.

SUMMARY OF THE INVENTION

According to one aspect of the invention, a computer system is provided with a rack defining an interior. A computer chassis is mounted at least partially within the interior of the rack, wherein the computer chassis defines an interior. An interconnect assembly is mounted at least partially within the interior of the rack, wherein the interconnect assembly has an interconnect connector. A processor assembly is mounted at least partially within the interior of the computer chassis, and the processor assembly has a processor board and a processor connector mounted to the processor board and connected to the interconnect connector of the interconnect assembly. The processor assembly also has at least eight addressable processor segments mounted to the processor board.

According to another aspect of the invention, the computer system includes a source of cooling air positioned to urge cooling air through the interior of the computer chassis along a path. The processor assembly is mounted at least partially within the interior of the computer chassis. The processor assembly has a processor board, two or more processor buses formed in the processor board, and at least one addressable processor segment coupled to each of the processor buses. A heat sink is thermally coupled to each of the addressable processor segments of the processor assembly, each heat sink having fins oriented along the path of cooling air. No more than two heat sinks are positioned serially along the path of cooling air.

According to yet another aspect of the invention, a processor assembly is provided with a processor board, a plurality of addressable processor segments mounted on the processor board, and at least two processor buses formed on the processor board, at least one of the buses being expandable to accommodate coupling of up to four or more of the addressable processor segments. An interface is mounted on the processor board and coupled to each of the at least two processor buses for communication of signals therebetween.

According to still another aspect of the invention, each of the buses of the processor assembly is coupled to at least one of the addressable processor segments and at least one connect bus is coupled to the interface. A cross bar switch is coupled to the at least one connect bus.

A processor assembly according to another aspect of the invention includes a processor board, at least eight addressable processor segments mounted on the processor board, and at least two processor buses formed on the processor board. The buses are interconnected to facilitate communication among the addressable processor segments, and signals are communicated among the addressable processor segments within the processor assembly.

A method for interconnecting a plurality of addressable processor segments on a single processor board is provided according to another aspect of the invention. The method includes mounting a plurality of addressable processor segments on the processor board, forming at least two processor buses on the processor board and coupling each of the buses to at least one of the addressable processor segments, and coupling an interface to each of the at least two processor buses for communication of signals therebetween.

According to yet another aspect of the invention, a computer subassembly is configured to be mounted within a rack. The computer subassembly includes a chassis configured for insertion into the rack and at least partially defining an interior, an interconnect assembly mounted within or adjacent the interior of the chassis and a processor assembly positioned at least partially within the interior of the chassis and connected to the interconnect assembly. The processor assembly is sized for insertion into and removal from the chassis. The processor assembly has a processor board and a plurality of addressable processor segments mounted on the processor board. At least two processor buses are formed on the processor board, at least one of the buses being expandable to accommodate coupling of up to four or more of the addressable processor segments. An interface is mounted on the processor board and coupled to each of the at least two processor buses for communication of signals therebetween.

BRIEF DESCRIPTION OF THE DRAWINGS

Exemplary embodiments of this invention will be described with reference to various figures selected for illustration of those exemplary embodiments. It will be appreciated, however, that this invention is not limited to the exemplary embodiments selected for illustration in the figures, of which:

FIG. 7 is a perspective view of components of the interconnect assembly illustrated in FIG. 6.

DETAILED DESCRIPTION OF THE INVENTION

Exemplary aspects of the invention will now be described with reference to the figures. It will be appreciated that variations and modifications of the exemplary embodiments illustrated and described herein may be made without departing from the spirit or scope of this invention. For example, the materials, sizes, proportions, and configurations of the illustrated embodiments can be changed, and the illustrated embodiments are not rendered to any specific proportion or scale.

Generally referring to the Figures, a computer system is provided with a rack, such as a conventional 19 inch rack, defining an interior. A computer chassis 302, 402 is mounted at least partially within the interior of the rack (not shown), wherein the computer chassis 302, 402 defines an interior 303, 403. An interconnect assembly 304, 404 is mounted at least partially within the interior of the rack, wherein the interconnect assembly 304, 404 has an interconnect connector 420. A processor assembly 10, 406A is mounted at least partially within the interior 303, 403 of the computer chassis 302, 402, and the processor assembly 10, 406A has a processor board 12 and a processor connector 424 mounted to the processor board 12 and connected to the interconnect connector 420 of the interconnect assembly 304, 404. The processor assembly 10, 406A also has at least eight addressable processor segments 14A through 14H mounted to the processor board 12.

The computer system includes a source of cooling air 412 positioned to urge cooling air through the interior 303, 403 of the computer chassis 302, 402 along a path. The processor assembly 10, 406A is mounted at least partially within the interior 303, 403 of the computer chassis 302, 402. The processor assembly 10, 406A has a single processor board 12, two or more processor buses 16A, 16B formed in the processor board 12, and at least one addressable processor segment 14A through 14H coupled to each of the processor buses 16A, 16B. A heat sink 15A though 15H is thermally coupled to each of the addressable processor segments 14A through 14H of the processor assembly 10, 406A, each heat sink 15A through 15H having fins oriented along the path of cooling air. No more than two heat sinks 15A through 15H are positioned serially along the path of cooling air.

At least one of the buses 16A and 16B can be expandable to accommodate coupling of up to four or more of the addressable processor segments 14A through 14H. An interface, such as that formed by one or both of interface circuits 20A, 20B, is mounted on the processor board 12 and coupled to each of the at least two processor buses 16A, 16B for communication of signals therebetween.

Each of the buses 16A, 16B of the processor assembly 10, 406A is coupled to at least one of the addressable processor segments 14A through 14H, and at least one connect bus 22A, 22B is coupled to the interface. A cross bar switch 24 is coupled to the at least one connect bus 22A, 22B.

The processor assembly 10, 406A is sized for insertion into and removal from the chassis 302, 402. The processor assembly 10, 406A has a processor board 12 and a plurality of addressable processor segments 14A through 14H mounted on the processor board. At least one of the processor buses 16A, 16B is expandable to accommodate coupling of up to four or more of the addressable processor segments 14A through 14H. An interface such as one or more of interface circuits 20A, 20B is mounted on the processor board 12 and coupled to each of the at least two processor buses 16A, 16B for communication of signals therebetween.

Figure 1:
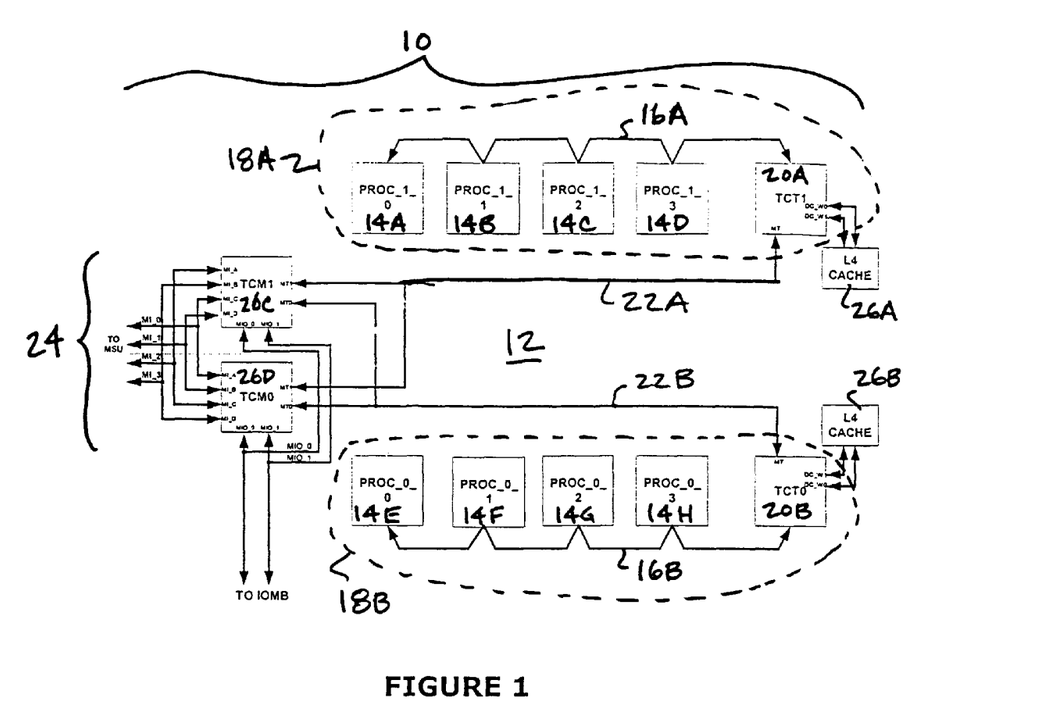
FIG. 1 is a schematic diagram of an exemplary embodiment of a processor assembly according to aspects of this invention.
Figure 2:
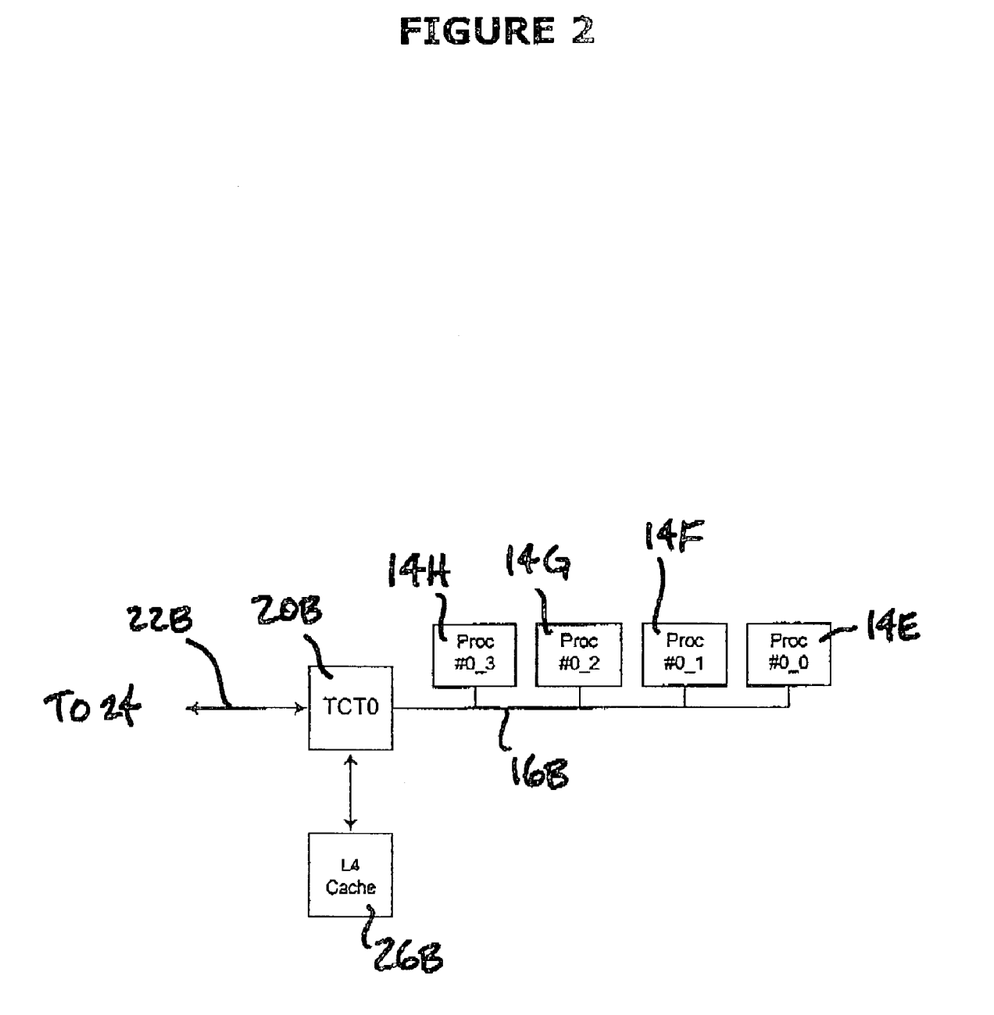
FIG. 2 is a schematic diagram of a portion of the processor assembly illustrated in FIG. 1.

Referring to FIGS. 1 and 2, an exemplary embodiment of a processor assembly 10 accordingly to aspects of this invention includes a processor board 12 that is modular in that it is a single board that can be inserted into or removed from an interior region of a computer or computer subassembly. A plurality of addressable processor segments 14A through 14H (8 shown) are mounted to one side of the single processor board 12. Addressable processor segments 14A through 14D are connected to one another by means of a processor bus 16A that is also connected to an interface circuit 20A such as a multi-processor manager device. Together, addressable processor segments 14A through 14D, processor bus 16A, and interface circuit 20A form a multi-processor cluster 18A. Similarly, addressable processor segments 14E through 14H, processor bus 16B, and interface circuit 20B together form a multi-processor cluster 18B.

The interface circuit 20A of multi-processor cluster 18A is coupled for communication with a cache 26A such as a low latency level 4 cache. Similarly, the interface circuit 20B of the multi-processor cluster 18B is coupled to the cache 26B.

In turn, a connect bus 22A extends from the interface circuit 20A of the multi-processor cluster 18A and extends to a crossbar switch 24. Likewise, a connect bus 22B forms a connection between interface circuit 20B and crossbar switch 24. The illustrated crossbar switch 24 includes a crossbar member 26C such as an ASIC as well as a crossbar member 26D (also an ASIC). The crossbar switch 24 is connected in turn to a main storage unit (MSU), and the crossbar switch 24 is also connected to an input/output motherboard (IOMB).

Referring now to FIG. 2, the interconnection between addressable processor segments 14E through 14H, processor bus 16B, interface circuit 20B, and cache 26B is illustrated. A similar structure is contemplated for the interconnection between addressable processor segments 14A through 14D, processor bus 16A, interface circuit 20A, and cache 26A.

Figure 12:
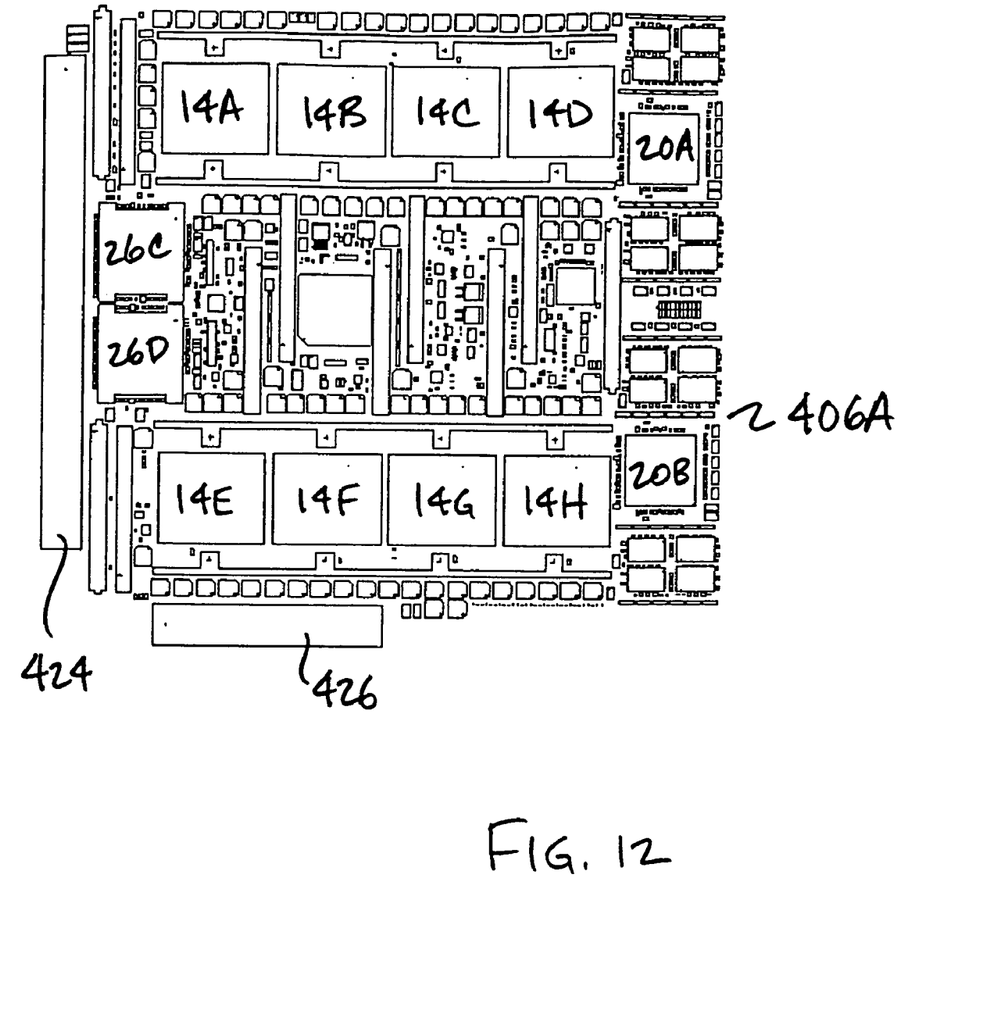
FIG. 12 is a schematic view of the processor circuit assembly shown in FIG. 9.

Referring now to FIG. 12, a schematic view of an exemplary embodiment of a printed circuit board according to aspects of this invention is shown. More specifically, some of the features shown schematically in FIGS. 1 and 2 will now be described in connection with an exemplary processor assembly. For example, the embodiment shown in FIG. 12 illustrates the respective positioning of addressable processor segments 14A through 14H and the orientation of the interfaces 20A, 20B and the crossbar member ASICs 26C, 26D.

The processor assembly illustrated in FIG. 12 can be considered to be a multi-processor/crossbar board of an eight-processor module or cell according to one aspect of this invention. The processor assembly contains up to 8 (or optionally more) processors, such as conventional processors (e.g., the Intel IA-32 Xeon family of processors and Intel IA-64 Itanium family of processors), on 2 separate busses, each of which is controlled by a multi-processor manager (such as interface circuit 20A, 20B), and external cache (such as cache 26A, 26B). Each multi-processor manager allows connection to external cache. The crossbar interconnects 26C, 26D provide a high performance connection among memory, I/O, and the interface circuit 20A, 20B.

Accordingly, included on one embodiment of the processor assembly are eight addressable processor segments 14A through 14H; two interface circuits 20A, 20B; two caches 26A, 26B (e.g., fourth level caches); and a crossbar switch 24, among other components. The eight processors are separated into two multi-processor clusters 18A and 18B. Each cluster 18A, 18B includes, respectively, four processors 14A through 14D and 14E through 14H; one interface circuit 20A, 20B; and a shared cache 26A, 26B. Each interface circuit 20A, 20B controls a processor bus 16A, 16B; cache 26A, 26B; and access to the crossbar switch 24.

A high performance, non-blocking crossbar switch 24 connects both multi-processor clusters, two IO bridges on an input output mother board (IOMB), and up to four main storage units. The crossbar 24 is implemented with two crossbar members 26C and 26D such as ASICs.

Within a multi-processor cluster 18A, 18B, an interface circuit 20A, 20B accesses a processor bus 16A, 16B extending among four microprocessors 14A through 14D and 14E through 14H; shared cache 26A, 26B; and the crossbar members 26C, 26D. Each interface circuit 20A, 20B interfaces the multi-processor cluster 18A, 18B and cache 26A, 26B to the crossbar 24.

An exemplary embodiment of a cell or module according to aspects of this invention contains a processor assembly, a memory assembly, an input output motherboard, and associated power, cooling, clocks, and maintenance components. Up to four eight processor-containing cells can be used to grow up to a thirty-two processor system. The cells are connected together via the interconnect assembly. Other components of a computer system according to aspects of the invention are the clock and maintenance assembly.

As shown in FIG. 1, each processor assembly 10 has four main storage unit busses, which are used to interface to system memory assemblies (MSUs) mounted on a separate circuit board (not shown). As described in detail below, each cell includes a processor assembly and a memory assembly. In a four cell system, one bus is routed to each main storage unit; one in its cell, and one to each of the three is other cells.

Figure 9:
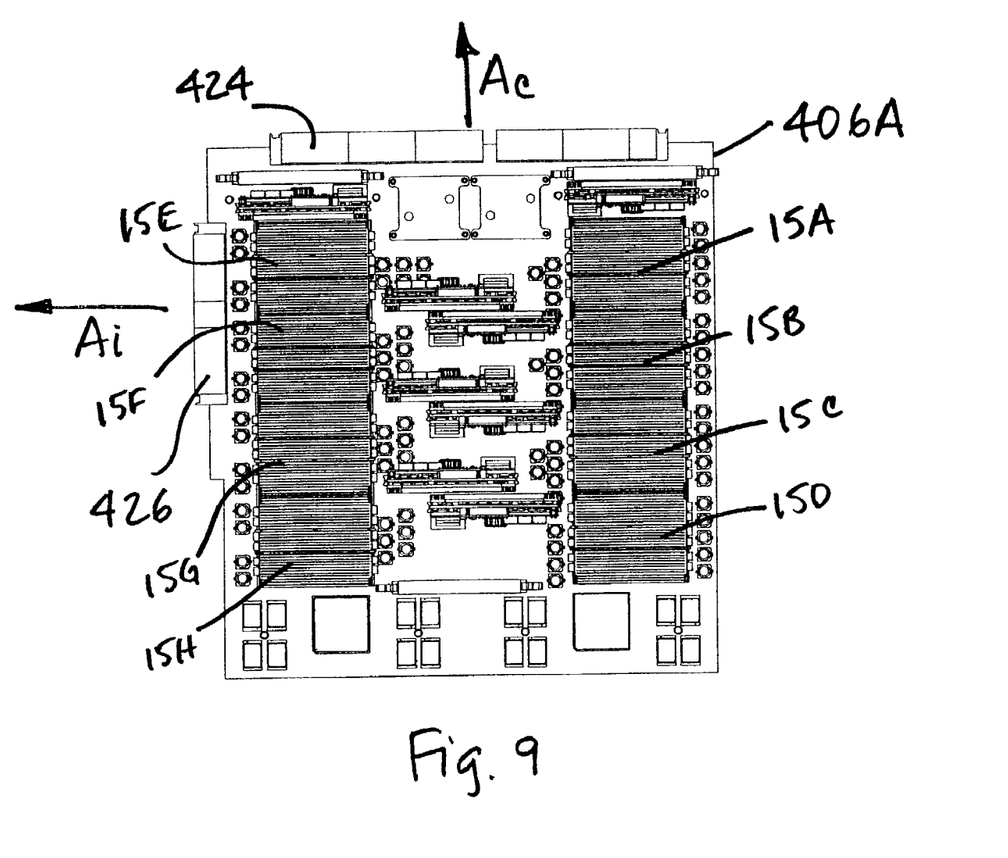
FIG. 9 is a plan view of an exemplary embodiment of a processor circuit assembly according to aspects of this invention.

As is illustrated in FIGS. 9 and 12, the addressable processor segments 14A through 14H are each contained in a package with an associated heat sink 15A through 15H. The processors and their respective heat sinks are mounted on the processor board in close proximity to one another. Further details of one manner of mounting the heat sinks in order to save board space are described in co-pending U.S. application Ser. No. 10/390,244, which is incorporated herein by reference.

Also, in view of the number of traces needed to transmit signals among the components of the processor assembly, it may be desirable to increase the density of the routing topology on the processor board. For example, it may be desirable to utilize high density routing for the ASIC components (e.g., components 20A, 20B, 26C, and 26D) of the processor assembly. Further details of one manner of providing high density routing for such components are described in co-pending U.S. application Ser. No. 10/390, 869, which is incorporated herein by reference.

Further, it may be desirable to interconnect the components of the processor board while minimizing the number of layers of the processor board. For example, it may be desirable to minimize the number of layers of the board to reduce board thickness and cost. Further details of one manner of reducing the number of layers of the processor board are described in co-pending U.S. application Ser. No. 10/390,383, which is incorporated herein by reference.

Referring now to FIGS. 3–7, additional exemplary embodiments of the present invention will now be described. Referring to the figures generally, a computer subassembly 300, 400 is configured to be mounted within a rack (not shown) along an insertion axis Ai. The computer subassembly 300, 400 includes a chassis 302, 402 configured for insertion into and removal from a rack along the insertion axis Ai, wherein the chassis 302, 402 at least partially defines an interior 303, 403. An interconnect assembly 304, 404 is mounted within or adjacent the interior 303, 403 of the chassis 302, 402. The interconnect assembly 304, 404 is oriented along a plane that is substantially parallel to the insertion axis Ai. At least one circuit assembly 306, 406A, 406B is positioned at least partially within the interior 303, 403 of the chassis 302, 402 and is configured to be connected to the interconnect assembly 304, 404. The circuit assembly 306, 406A, 406B is oriented in a plane substantially parallel to the insertion axis Ai. A source of cooling air 412 is positioned to direct cooling air through the interior 303, 403 of the chassis 302, 402 along the insertion axis Ai.

The circuit assembly 306, 406A, 406B can be connected to the interconnect assembly 304, 404 along a connection axis Ac oriented at an angle to the insertion axis Ai. That angle between the connection axis Ac and the insertion axis Ai can be about 90 degrees (i.e., the connection axis Ac and insertion axis Ai can be substantially perpendicular with respect to one another).

According to an exemplary method for configuring a rack-mounted computer subassembly for improved cooling, and again referring generally to FIGS. 3–7, the interconnect assembly 304, 404 is oriented in a plane substantially parallel to the insertion axis Ai along which the computer subassembly is inserted into a rack. At least one circuit assembly 306, 406A, 406B can be connected to the interconnect assembly 304, 404 along a connection axis Ac that is angled with respect to the insertion axis Ai, and the circuit assembly 306, 406A, 406B is oriented in a plane substantially parallel to the insertion axis Ai. A source of cooling air 412 is positioned to direct cooling air along the insertion axis.

Figure 3:
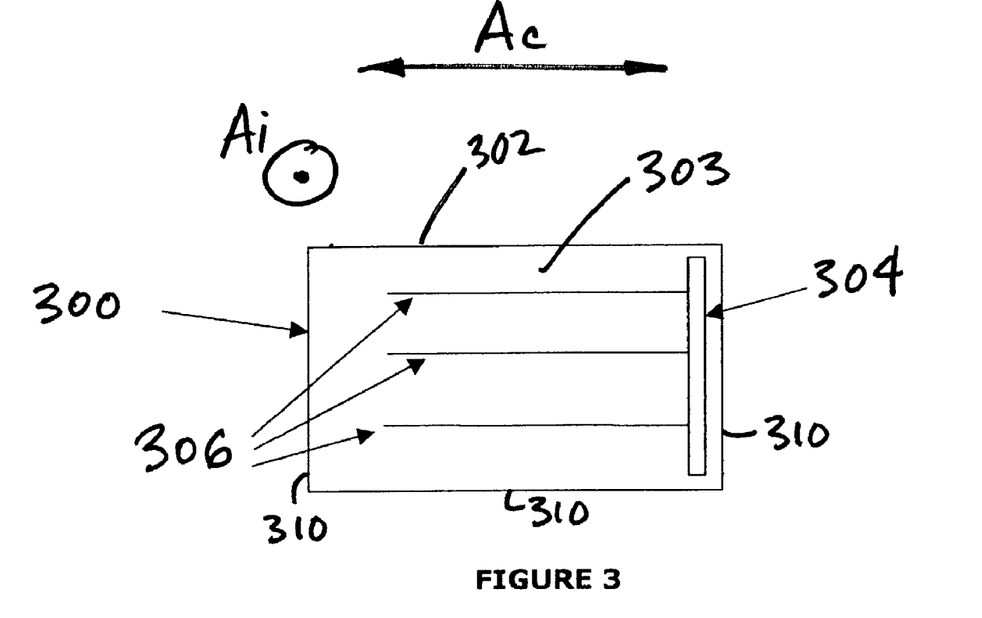
FIG. 3 is a schematic front view of an exemplary embodiment of a computer subassembly according to aspects of this invention.

Referring specifically to the embodiment illustrated schematically in FIG. 3, the computer subassembly 300 includes a chassis 302 including wall portions 310. The chassis 302 can be formed from sheet metal or any other suitable material. The wall portions 310 of the chassis 302 may provide solid, continuous surfaces that substantially or completely enclose an interior region 303 of the chassis 302. Alternatively, the wall portions 310 of the chassis 302 may merely provide a frame or other structure that at least partially defines the interior 303 of the chassis 302.

Whether completely or partially enclosed by wall portions 310, the chassis 302 is provided with an access opening that is oriented to permit the insertion of circuit assemblies 306 into the interior 303 of the chassis 302 in a direction along or substantially parallel to the insertion axis Ai, which extends into the page in FIG. 3. The access opening of the chassis 302 is also oriented along the path of cooling air through the chassis 302.

Though the orientation of the computer subassembly 300 is not critical to the invention, the access opening of the chassis 302 may for example be positioned at the front or rear of the computer assembly. Such an orientation helps to facilitate air flow through the computer subassembly 300 from the front to the back of the subassembly 300 or from the back to the front of the subassembly 300.

The chassis 302 is configured to be inserted along the insertion axis Ai (perpendicular to the page) with respect to a rack (not shown). The chassis 302, together with wall portions 310, defines the interior 303 into which an interconnect assembly 304 can be positioned. Although interconnect assembly 304 is shown within the interior 303 of chassis 302 in FIG. 3, the interconnect assembly 304 can be positioned outside of the chassis 302 (as in the embodiment illustrated in FIGS. 4–7) or otherwise adjacent the interior 303 of the chassis 302.

The chassis 302 is sized to accommodate one or more circuit assemblies 306 (3 shown in FIG. 3), which are connected to the interconnect assembly 304 by means of interconnect connectors. More specifically, circuit assemblies 306 are connected to interconnect assembly 304 along a connection access Ac shown in FIG. 3. Though not shown in FIG. 3, connectors on circuit assemblies 306 mate with connectors on interconnect assembly 304 for the communication and transmission of signals and power.

Accordingly, in the exemplary embodiment shown in FIG. 3, the circuit assemblies 306 are installed into the interior of the chassis 302 of the computer subassembly 300 by first inserting the circuit assemblies 306 into the interior 303 of the chassis 302 through an access opening in the front of the chassis 302 and generally along or parallel to the insertion access Ai. The circuit assemblies 306 are then connected to the interconnect assembly 304 by movement of the circuit assemblies along the connection axis Ac. In the embodiment illustrated in FIG. 3, the connection axis Ac is substantially perpendicular to the insertion axis Ai, although other angles between the connection axis Ac and the insertion axis Ai are contemplated as well.

By virtue of the configuration illustrated in FIG. 3, it is possible to orient the interconnect assembly 304 along a plane that is substantially parallel to the insertion axis Ai. It is also possible to orient the circuit assemblies 306 in planes that are also substantially parallel to the insertion axis Ai. By orienting the circuit assemblies 306 and interconnect assembly 304 along planes that are substantially parallel to the insertion axis Ai, cooling air flow passing through the chassis 302 generally along the insertion axis Ai can pass along the surfaces of the circuit assemblies 306 and/or interconnect assembly 304. Such air flow can therefore pass through the interior of the chassis 302 without substantial interference by a mid plane or back plane. Accordingly, in the embodiment illustrated in FIG. 3, while the circuit assemblies 306 and interconnect assembly 304 are all oriented in planes substantially parallel to the insertion axis Ai (and therefore generally parallel to the flow of air), the circuit assemblies 306 are oriented in planes substantially perpendicular to that of the interconnect assembly 304. Although other angles between the planes of the circuit assemblies 306 and the interconnect assembly 304 the insertion axis Ai are contemplated, it is believed that the orientation illustrated in the exemplary embodiment of the computer subassembly 300 shown in FIG. 3 may optimize the cooling of the system.

In the exemplary embodiment shown in FIG. 3, during installation the circuit assemblies 306 are moved along several axes as they are inserted into the chassis 302 and connected to the interconnect assembly 304. More specifically, they are first moved along an insertion axis Ai and then along a connection axis Ac. It may, therefore, be desirable to add features to the chassis 302 in order to accommodate such manipulation of the circuit assemblies 306. For example, a cam mechanism can be added to the chassis 302 or to the circuit assemblies 306 to accomplish the connection of the circuit assemblies 306 and the interconnect assembly 304 along the connection axis Ac. Such a cam mechanism may help to generate the insertion force necessary to couple a connector on a circuit assembly 306 to a connector on the interconnect assembly 304, in a direction generally along is the connection axis Ac. An exemplary cam mechanism is described in co-pending U.S. patent application Ser. No. 10/389,824, which is incorporated herein by reference.

Although not shown in FIG. 3, one or more of the circuit boards 306 can optionally include a connector that is oriented for connection along the insertion axis Ai. For example, in an embodiment having a circuit assembly 306 including one or more processors, it may be necessary or desirable to provide the circuit assembly 306 with a connector to facilitate connection to an input-output (I/O) board. If the I/O board has a connector oriented along the insertion axis Ai, the circuit assembly 306 can be provided with a mating I/O connector so oriented as well as one or more interconnect connectors oriented along the connection axis Ac. Accordingly, one or more circuit assemblies 306 can have connectors oriented along angled axes Ai and Ac. If such connectors are provided on a particular circuit assembly 306, a connector oriented along the insertion axis Ai is preferably connected first followed by the connection of the connector oriented along the connection axis Ac, or vice versa.

Figure 4:
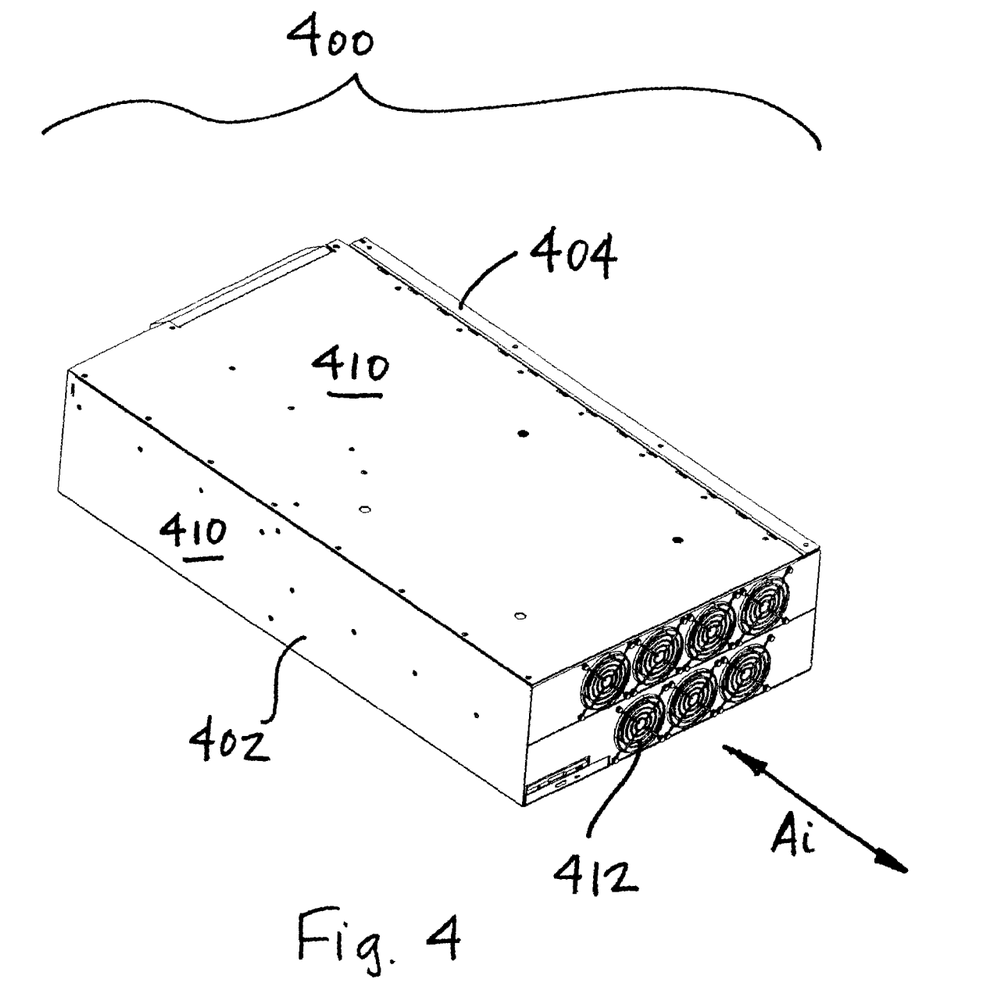
FIG. 4 is a perspective view of another exemplary embodiment of a computer subassembly according to aspects of this invention.

Referring now to FIGS. 4–7, another exemplary embodiment of a computer subassembly, generally designated by the numeral "400", will now be described. As shown in FIG. 4, the computer subassembly 400 is similar to the computer subassembly 300 in that it includes a chassis 402 having wall portions 410 and an interconnect assembly 404. Computer subassembly 400 also includes a cooling source 412 which, in this embodiment, includes a plurality of box fans oriented to direct cooling air flow along the insertion axis Ai of the computer subassembly 400.

Computer subassembly 400 differs from computer assembly 300 in that the interconnect assembly 404 of the computer subassembly 400 is located adjacent to (but not within) the interior of the chassis 402. The modular interconnect assembly 404 will be described later with reference to FIGS. 6 and 7. In order to move the interconnect assembly 404 with respect to the chassis 402, the banks of box fans (cooling source 412) can be moved, and the interconnect assembly 404 can be moved in a direction generally parallel to the insertion axis Ai.

The computer subassembly 400 illustrated in FIG. 4 is a modular computer subassembly that is configured for use in a scalable computer system. Accordingly, multiple subassemblies like or substantially identical to computer subassembly 400 can be interconnected to form a larger computer system. Each computer subassembly 400 may be configured such that it can be removed and replaced while the remainder of the computer system is running. Also, the computer subassembly 400 is optionally configured such that one or more circuit assemblies can be swapped out of the interior of the computer subassembly 400.

Figure 5:
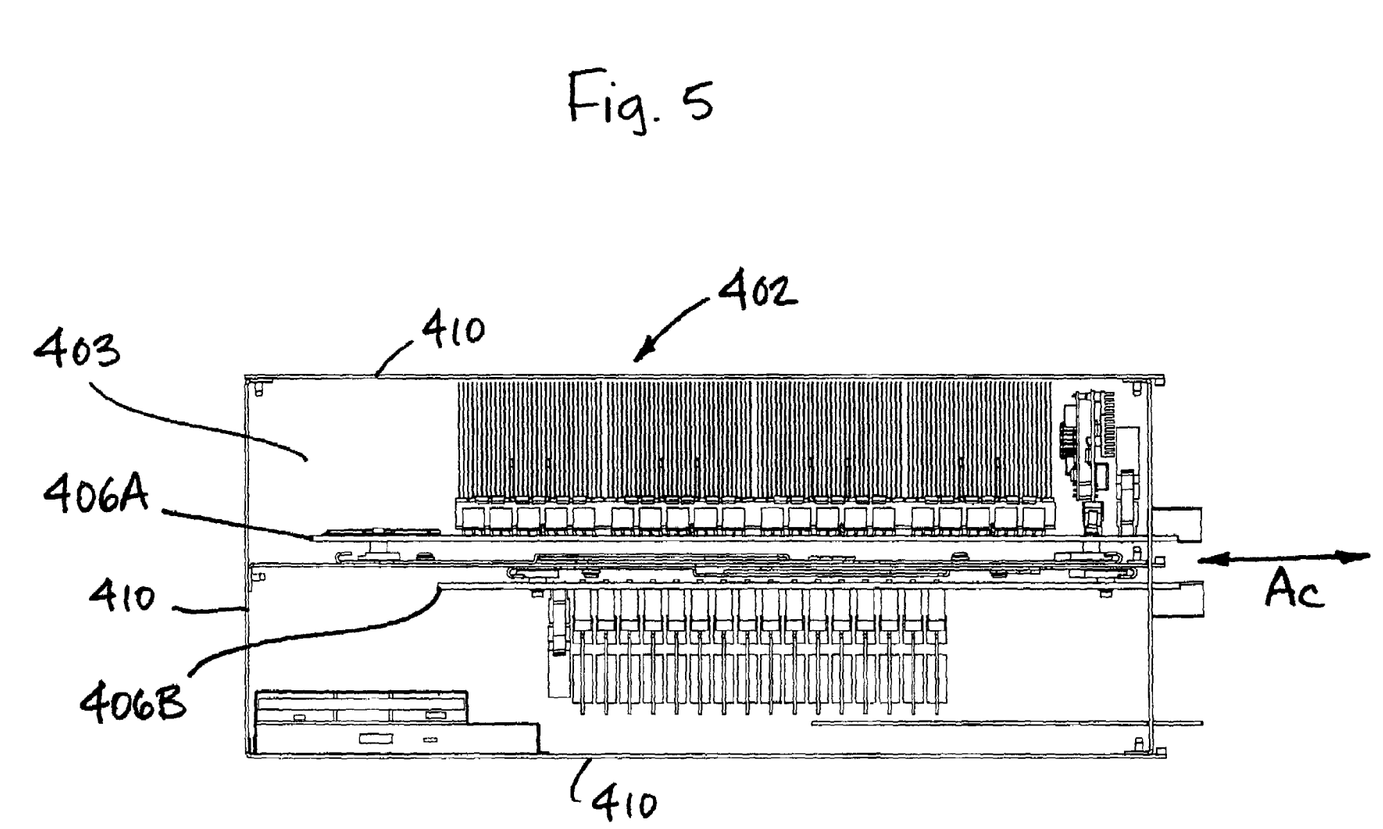
FIG. 5 is a front view of a portion of the computer subassembly illustrated in FIG. 4.

Referring now to FIG. 5, the computer subassembly 400 is illustrated with the cooling source 412 and the interconnect assembly 404 removed. The computer subassembly 400 includes a chassis 402 that, by means of wall portions 410, defines an interior 403. A plurality of circuit assemblies can be accommodated within the interior 403 of the chassis 402. Specifically, in the embodiment illustrated in FIG. 5, the chassis 402 is sized to accommodate a processor circuit assembly 406A and a memory circuit assembly 406B.

The circuit assemblies 406A and 406B are inserted into the interior of the chassis 402 along an insertion axis Ai that is perpendicular to the page as illustrated in FIG. 5. The circuit assemblies 406A and 406B are then connected to the interconnect assembly (not shown in FIG. 5) by moving each circuit assembly 406A and 406B along the connection axis Ac (to the right in FIG. 5). The interconnect assembly 404 is positioned adjacent the outer surface of the wall portion on the right-hand side of the chassis 402. Openings in the chassis 402 accommodate interconnect connectors that are attached to the circuit assemblies 406A and 406B for engagement to the interconnect assembly 404.

Figure 6:
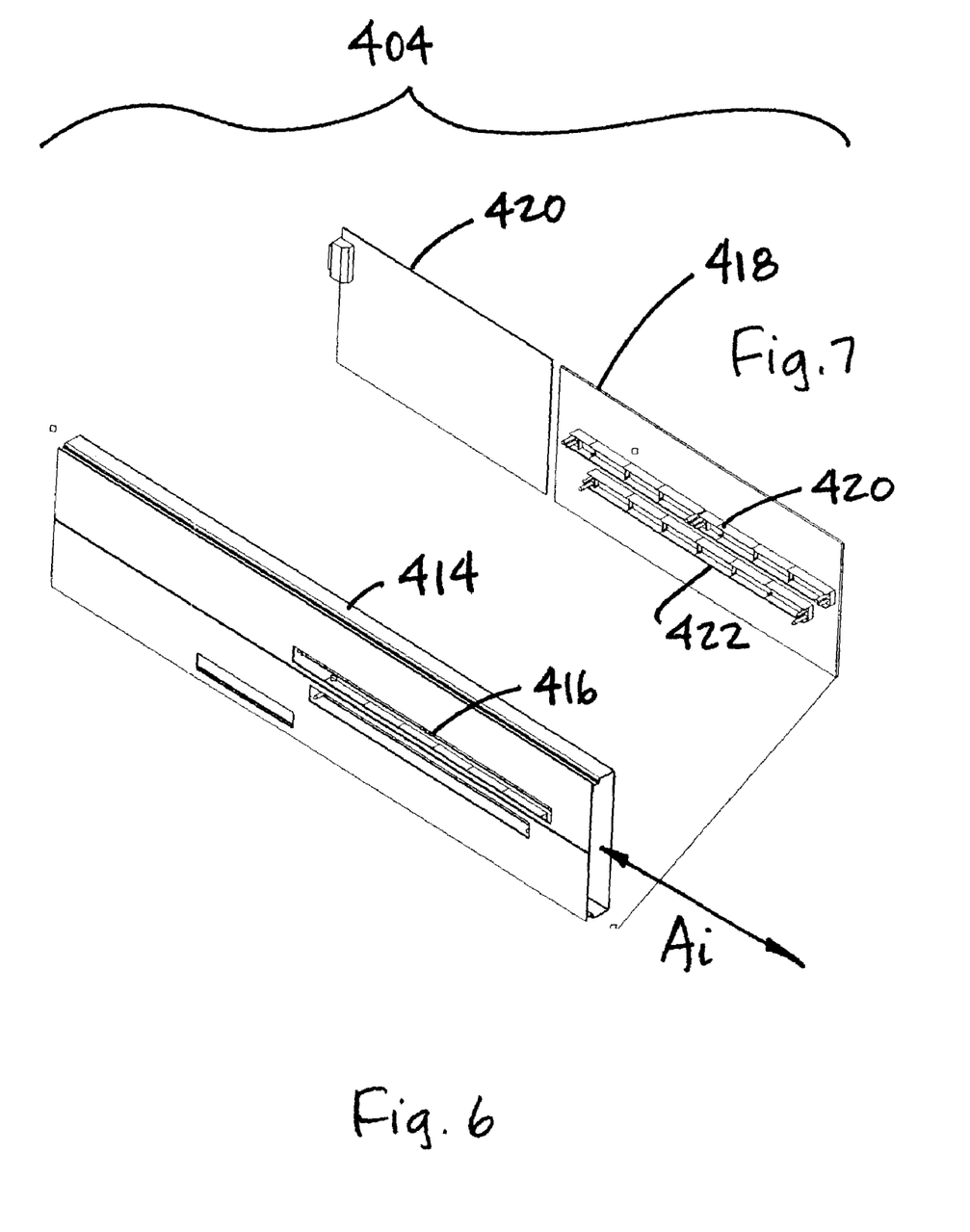
FIG. 6 is a perspective view of an exemplary embodiment of an interconnect assembly configured for use in the computer subassembly illustrated in FIG. 4.

Referring now to FIGS. 6 and 7, an exemplary embodiment of an interconnect assembly 404 is illustrated. As stated previously, the interconnect assembly 404 is modular with respect to a computer system in the illustrated embodiment in that it can be installed and removed along an axis parallel to the insertion axis Ai.

Referring specifically to FIG. 6, the interconnect assembly 404 includes a chassis 414 having a plurality of access openings 416. The access openings 416 accommodate the interconnect connectors extending from the circuit assemblies 406A and 406B mounted within the chassis 402 of the computer subassembly 400.

Referring now to FIG. 7, components of the interconnect assembly 404 are illustrated. Specifically, a printed circuit assembly 418 is configured to be mounted within the interior of the chassis 414 of the interconnect assembly 404. In this embodiment, the printed circuit assembly 418 forms a component of a Cellular Interconnect Module (CIM). The printed circuit assembly 418 includes an interconnect connector 420 positioned for interconnection with the circuit assembly 406A of the computer subassembly 400. The printed circuit assembly 418 also includes an interconnect connector 422 for interconnection with the circuit assembly 406B of the computer subassembly 400.

The interconnect assembly 404 also includes a printed circuit assembly 420. The printed circuit assemblies 418 and 420 are oriented so that they reside in a plane that is substantially parallel to the insertion axis Ai. In such a configuration, the interconnect assembly 404 does not substantially interfere with the flow of cooling air flowing from the front to the back of the rack-mounted computer system.

Referring now to FIGS. 8 through 11, the manner in which the circuit assemblies 406A and 406B are installed in the chassis 402 will be described. A shelf or other divider is provided in the interior 403 of chassis 402 in order to separate the interior 403 of the chassis 402 into a processor region (the top portion in FIG. 8) and a memory region (the bottom portion in FIG. 8).

Figure 8:
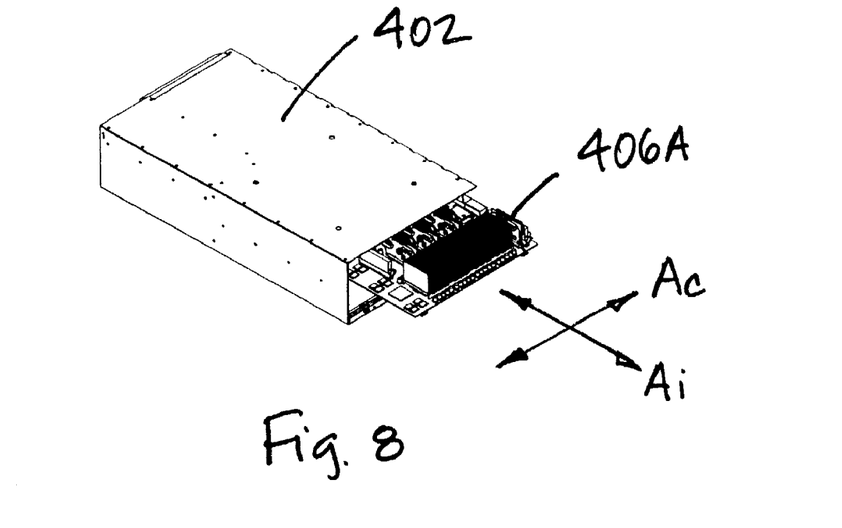
FIG. 8 is a perspective view of components of the computer subassembly illustrated in FIG. 5.

Referring specifically to FIG. 8, a processor circuit assembly 406A is shown partially inserted into the processor region of the chassis 402 along the insertion axis Ai. Upon complete insertion of the processor circuit assembly 406A into the interior 403 of the chassis 402 along the insertion axis Ai, the processor circuit assembly 406A is connected to an interconnect assembly (not shown in FIG. 8) along a connection axis Ac. Referring to FIG. 9, which illustrates an exemplary embodiment of a processor circuit assembly 406A, the processor circuit assembly 406A includes an interface connector 424 that is oriented for connection along the connection axis Ac. The processor circuit assembly 406A also includes an I/O connector 426 that is oriented for connection to a mating connector within the chassis 402 along the insertion axis Ai.

Figure 10:
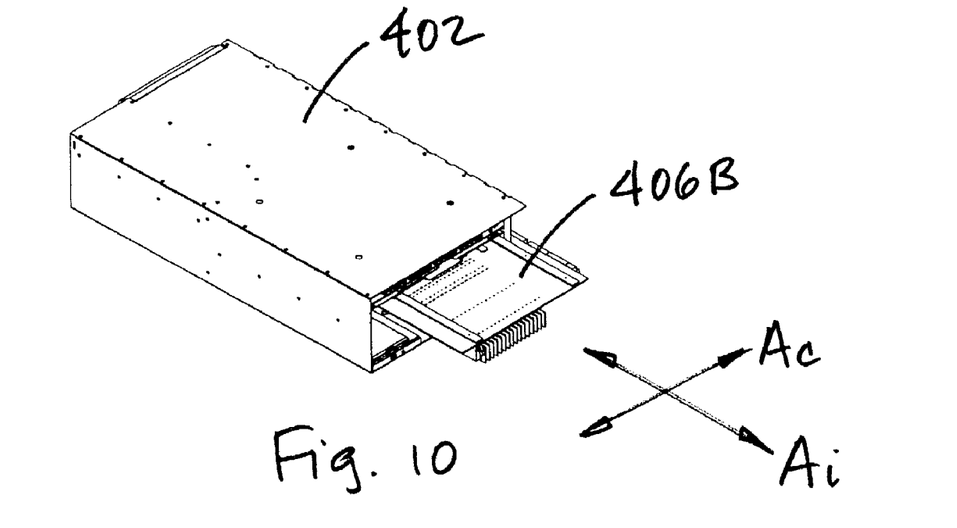
FIG. 10 is another perspective view of components of the computer subassembly illustrated in FIG. 5.
Figure 11:
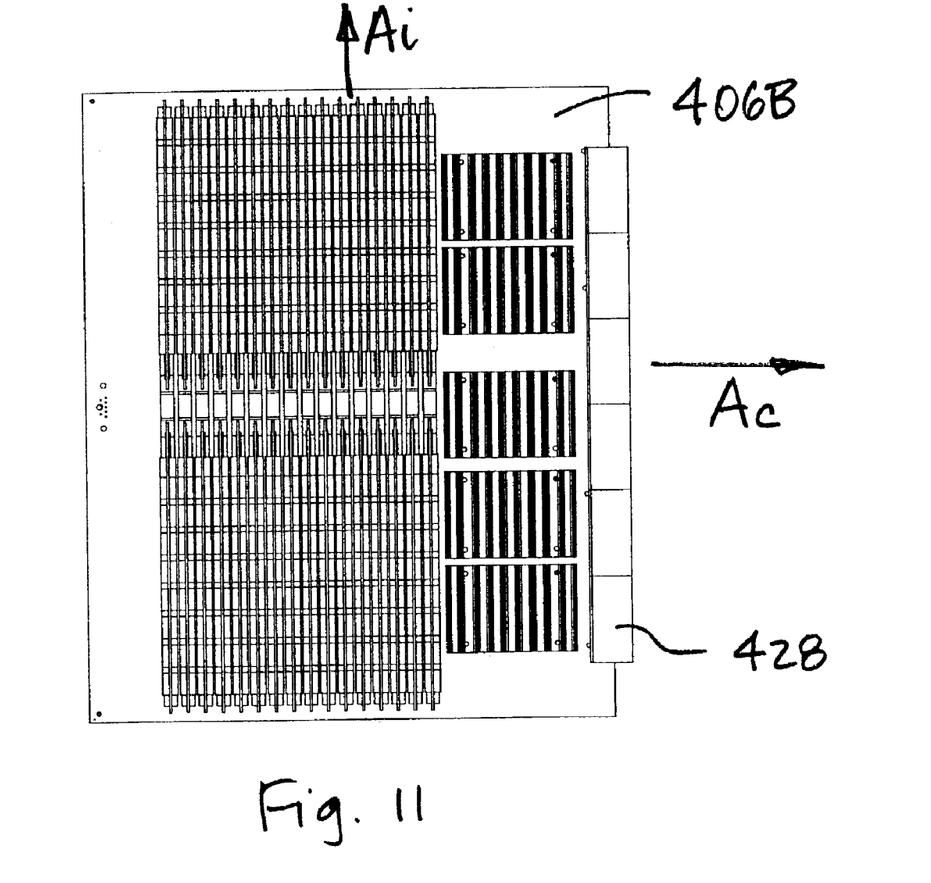
FIG. 11 is a plan view of an exemplary embodiment of a memory circuit assembly according to aspects of this invention.

Referring now to FIG. 10, the memory circuit assembly 406B is shown partially inserted within the interior 403 of the chassis 402. Upon complete insertion of the memory circuit assembly 406B into the chassis 402 along the insertion axis Ai, the memory circuit assembly 406B can be connected to an interconnect assembly (not shown) along the connection axis Ac. Referring to FIG. 10, the exemplary memory circuit assembly 406B includes an interconnect or interface connector 428 that is oriented for connection along the connection axis Ac.

In use, the modular computer subassemblies 300 and 400 can be installed in a rack-mounted computer system in a fully assembled condition (i.e., with one or more circuit assemblies mounted within a chassis and connected to an interconnect assembly that is either within or adjacent the interior of the chassis). Alternatively, the circuit assemblies can be installed into the interior of the chassis and interconnected to an interconnect assembly after the chassis has already been installed within the rack.

The interconnect assembly, though shown adjacent to a side wall of a chassis, can alternatively be positioned at a location that is spaced from one or more walls of the chassis. For example, the interconnect assembly can be positioned centrally within the chassis of the computer subassembly as a mid plane. In such a position, circuit assemblies could then be connected to both sides of the interconnect assembly. Also, although the interconnect assembly of the illustrated embodiments is oriented along a substantially vertical plane, the interconnect assembly can be positioned horizontally or at any angle to horizontal. Preferably, however, the interconnect assembly (whether vertical, horizontal or otherwise positioned) will be oriented along a plane that is substantially parallel to the axis of cooling air flow for the computer subassembly.

While preferred embodiments of the invention have been shown and described herein, it will be understood that such embodiments are provided by way of example only. Numerous variations, changes and substitutions will occur to those skilled in the art without departing from the spirit of the invention. For example, the interface circuits 20A and 20B of the processor assembly can be combined into one interface circuit, thereby eliminating the need for a crossbar switch such as that provided by crossbar 24. Accordingly, the circuits 20A and 20B can be modified or combined for direct communication with a memory provided on the processor assembly or incorporated into the interface circuitry. The connect busses 22A and 22B can also be combined into a single bus for communication between an interface and a memory, whether that memory is located on the processor assembly board or off board on a separate memory assembly.

Other variations and modifications can be made to the embodiments selected for illustration. Accordingly, it is intended that the appended claims cover all such variations as fall within the spirit and scope of the invention.

What is claimed is:

1. A computer system comprising:
 a rack defining an interior;
 a computer chassis mounted at least partially within said interior of said rack, said computer chassis defining an interior;
 an interconnect assembly mounted at least partially within said interior of said rack, said interconnect assembly having an interconnect connector;
 a processor assembly mounted at least partially within said interior of said computer chassis, said processor assembly having a processor board having a surface and a processor connector mounted to said processor board and connected to said interconnect connector of said interconnect assembly, said processor assembly also having at least eight addressable processor segments mounted on the surface of said processor board, each of said addressable processor segments residing in a common plane on the surface of said processor board when said addressable processor segments are mounted on the surface of said processor board, processor buses formed on said processor board, each of said addressable processor segments being electrically coupled to one of said processor buses, and an interface mounted on the surface of said processor board and coupled to each of said processor buses for communication of signals there between.

2. The computer system recited in claim 1, said rack being a standard 19 inch rack.

3. The computer system recited in claim 1, said interconnect assembly being mounted within or adjacent said interior of said computer chassis.

4. The computer system recited in claim 1, wherein at least two processor segments are electrically coupled to each of said processor buses.

5. The computer system recited in claim 1, wherein at least four processor segments are electrically coupled to at least one of said processor buses.

6. A computer system comprising:
 a computer chassis defining an interior;
 a source of cooling air positioned to urge cooling air through said interior of said computer chassis along a path;
 a processor assembly mounted at least partially within said interior of said computer chassis, said processor assembly having a processor board, two or more processor buses formed in said processor board, a plurality of addressable processor segments mounted on the processor board, a first addressable processor segment of said plurality of addressable processor segments coupled to one of said processor buses and a second addressable processor segment of said plurality of addressable processor segments coupled to another one of said processor buses, and an interface mounted on said processor board and coupled to each of said two or more processor buses for communication of signals between the processor buses within said processor assembly;
 a heat sink thermally coupled to each of said addressable processor segments of said processor assembly, each said heat sink having fins oriented along said path of cooling air, wherein no more than two heat sinks are positioned serially along said path of cooling air.

7. The computer system recited in claim 6, said processor assembly having more than four addressable processor segments electrically coupled to said processor board.

8. The computer system recited in claim 6, said computer chassis defining an access opening along an insertion axis generally parallel to said path of cooling air.

9. The computer system recited in claim 8, said processor board being oriented in a plane substantially parallel to said insertion axis.

10. The computer system recited in claim 8, said processor buses being oriented in a direction substantially perpendicular to said insertion axis.

11. The computer system recited in claim 6, said processor assembly having at least two addressable processor segments electrically coupled to each of said processor buses.

12. The computer system recited in claim 6, said processor assembly having at least four addressable processor segments electrically coupled to at least one of said processor buses.

13. A processor assembly comprising:
 a processor board;
 at least eight addressable processor segments mounted on said processor board;
 at least two processor buses formed on said processor board, at least one of said buses being expandable to accommodate coupling of up to four or more of said addressable processor segments; and
 an interface mounted on said processor board and coupled to each of said at least two processor buses for communication of signals between a first of said at least two processor buses and a second of said at least two processor buses within said processor assembly.

14. The processor assembly recited in claim 13, said interface comprising an interface circuit associated with each of said processor buses.

15. The processor assembly recited in claim 14, said interface further comprising a cross bar coupled to each of said interface circuits for communication of signals there between.

16. The processor assembly recited in claim 13, further comprising a cache mounted on said processor board and coupled to said interface.

17. The processor assembly recited in claim 13, wherein each of said addressable processor segments is substantially identical to others of said addressable processor segments.

18. The processor assembly recited in claim 13, wherein said processor board is sized to fit horizontally within a 19 inch rack.

19. A processor assembly comprising:
 a processor board;
 a plurality of addressable processor segments mounted on said processor board;
 at least two processor buses formed on said processor board, each of said buses being coupled to at least one of said addressable processor segments;
 a plurality of interface circuits mounted on said processor board each of said plurality of interface circuits coupled to a respective one of said at least two processor buses;
 a plurality of connect buses formed on said processor board, each of said plurality of connect buses coupled to a respective one of said interface circuits; and
 a cross bar switch mounted on said processor board coupled to each of said plurality of connect buses for communication of signals there between within the processor assembly.

20. The processor assembly recited in claim 19, further comprising a cache mounted on said processor board and coupled to said interface.

21. The processor assembly recited in claim 19, wherein each of said addressable processor segments is substantially identical to others of said addressable processor segments.

22. A processor assembly comprising:
- a processor board having a first surface and a second surface opposite the first surface;
- at least eight addressable processors mounted on the first surface of said processor board;
- at least two processor buses formed on said processor board;
- an interface on said processor board connected to each of said at least two processor buses, said at least two processor buses being interconnected through the interface to facilitate communication among said addressable processors, wherein signals are communicated among said addressable processors within said processor assembly.

23. A method for interconnecting a plurality of addressable processor segments on a single processor board, said method comprising the steps of:
- mounting a plurality of addressable processor segments on the processor board;
- forming at least two processor buses on said processor board and coupling each of the buses to at least one of the addressable processor segments;
- mounting at least two interface circuits and a crossbar switch on the processor board; and
- coupling the crossbar to each of the at least two processor buses through the interface circuits for communication of signals between a first of the at least two processor buses and a second of the at least two processor buses on the single processor board.

24. The method recited in claim 23, further comprising the step of coupling at least one connect bus to each of the interface circuits.

25. The method recited in claim 24, further comprising the step of coupling a cross bar switch to the at least one connect bus.

26. The method recited in claim 23, said coupling step comprising associating an interface circuit with each of the processor buses.

27. The method recited in claim 26, said coupling step further comprising coupling a cross bar to each of the interface circuits for communication of signals there between.

28. The method recited in claim 23, further comprising the step of mounting a cache on the processor board and coupling the cache to the interface.

29. A computer subassembly configured to be mounted within a rack, said computer subassembly comprising:
- a chassis configured for insertion into the rack and at least partially defining an interior;
- an interconnect assembly mounted within or adjacent said interior of said chassis; and
- a processor assembly positioned at least partially within said interior of said chassis and connected to said interconnect assembly, said circuit assembly being sized for insertion into and removal from said chassis, said processor assembly having:
- a processor board;
- a plurality of addressable processor segments mounted on said processor board;
- at least two processor buses formed on said processor board, at least one of said buses being expandable to accommodate coupling of up to four or more of said addressable processor segments; and
- an interface including at least two interface circuits and a cross bar switch mounted on said processor board and coupled to each of said at least two processor buses for communication of signals between a first of said at least two processor buses and a second of said at least two processor buses within said processor assembly.

* * * * *